United States Patent [19]

Ford

[11] Patent Number: 5,478,975

[45] Date of Patent: Dec. 26, 1995

[54] VIBRATING BEAM FORCE SENSOR CLAMPING ASSEMBLY

[75] Inventor: Michael W. Ford, Sutton Coldfield, England

[73] Assignee: GEC Avery Limited, United Kingdom

[21] Appl. No.: 281,788

[22] Filed: Jul. 28, 1994

Related U.S. Application Data

[63] Continuation of Ser. No. 14,762, Feb. 8, 1993, abandoned.

[30] Foreign Application Priority Data

Feb. 14, 1992 [GB] United Kingdom ............... 9203227

[51] Int. Cl.[6] ...................................................... G01G 3/14
[52] U.S. Cl. ................................. 177/210 FP; 73/862.59
[58] Field of Search .................... 177/210 FP; 73/862.59, 73/761; 411/166, 411, 424

[56] References Cited

U.S. PATENT DOCUMENTS

| 409,696 | 8/1889 | Motherwell | 411/424 |
| 440,331 | 11/1890 | Rogers | 411/424 |
| 1,966,835 | 7/1934 | Stites | 411/424 |
| 1,969,796 | 8/1934 | Hoke | 411/424 |
| 1,988,925 | 1/1935 | Thomson | 411/424 |
| 3,456,972 | 7/1969 | Drotar | 411/166 |
| 3,630,253 | 12/1971 | Sherman | 411/166 |
| 3,731,961 | 5/1973 | Becker | 411/166 |
| 4,273,205 | 6/1981 | De Voogd | 177/210 FP |
| 4,947,694 | 8/1990 | Kirman et al. | 73/862.59 |

Primary Examiner—Peter S. Wong
Assistant Examiner—Randy W. Gibson
Attorney, Agent, or Firm—Kirschstein et al.

[57] ABSTRACT

In a load cell for a weighing machine, the load cell includes a vibrating beam force sensor clamped at its two ends to respective support parts of the load cell, and wherein each end of the sensor is clamped by a bolt having a head which traps the associated end of the sensor against a support part, the bolt having remote from its head a threaded portion engaged with a nut which tensions the bolt, and a portion of non-circular cross section having at least one cross sectional dimension which is greater than that of the threaded portion, the non-circular cross section portion of the bolt having been drawn through a hole in the support part which had a diameter less than said one cross sectional dimension. This reduces the production of forces parallel to the plane in which clamping is required.

6 Claims, 3 Drawing Sheets

FIG.3a PRIOR ART
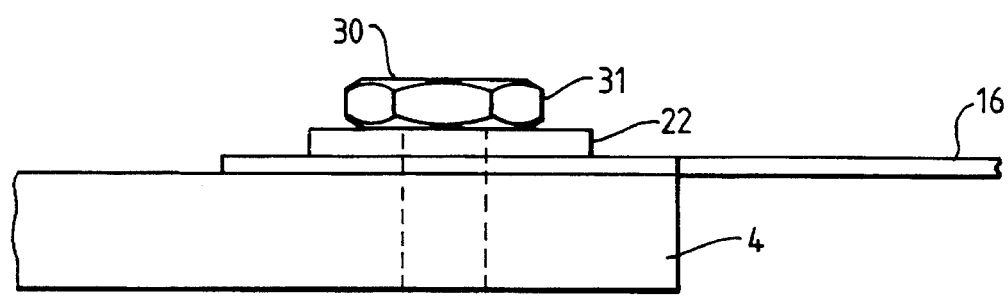
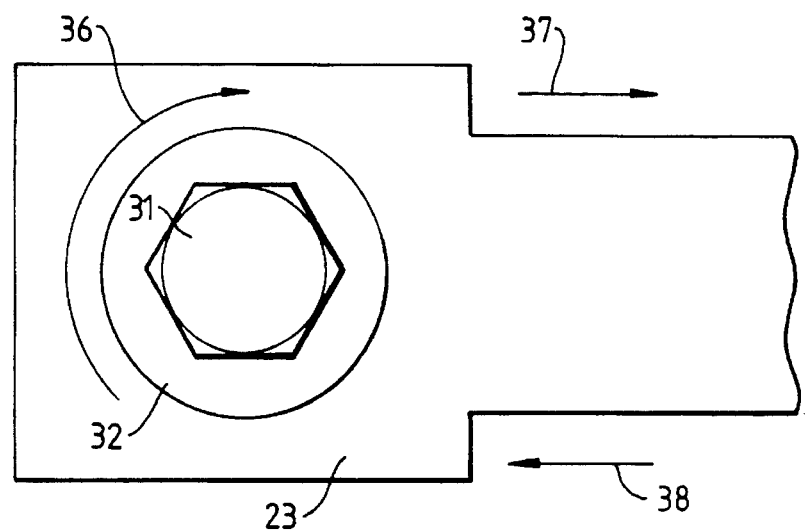
FIG.3b PRIOR ART

VIBRATING BEAM FORCE SENSOR CLAMPING ASSEMBLY

CROSS REFERENCE TO RELATED APPLICATION

This application is a continuation of U.S. application Ser. No. 08/014,762, filed Feb. 8, 1993, now abandoned.

BACKGROUND OF THE INVENTION

The present invention concerns force sensors for use with weighing machines. The invention is particularly concerned with what are known as vibrating beam force sensors and the manner in which they are mounted within load cells. Such sensors are well known and essentially comprise either two parallel beams or a central beam surrounded by two outer beams, the sensor being made from a single piece of metal. In operation the ends of such a sensor are clamped to a loading frame which forms part of a load cell. The sensor is clamped so that it is under tension and the beam is driven into flexural vibration by suitable transducers. The vibrational frequency of the beam changes in response to variations in tension and these changes are measured to provide a measurement of the applied tension and thus of the applied load.

The clamping of vibrating beam force sensors has a critical effect on their performance. An ideal clamp will produce only a force perpendicular to the surface to which clamping is required. However most clamps produce forces parallel to the plane in which clamping is required.

SUMMARY OF THE INVENTION

The present invention is concerned with reducing this disadvantage.

In accordance with the present invention there is provided a load cell for a weighing machine, the load cell including a vibrating beam force sensor clamped at its two ends to respective support parts of the load cell, and whereas each end of the sensor is clamped by a bolt having a head which traps the associated end of the sensor against a support part, the bolt having remote from its head a threaded portion engaged with a nut which tensions the bolt, and a portion of non-circular cross section having at least one cross-sectional dimension which is greater than that of the threaded portion, the non-circular cross sectional portion of the bolt having been drawn through a hole in the support part which had a diameter less than said one cross-sectional dimension.

BRIEF DESCRIPTION OF THE DRAWINGS

In order that the invention may be more readily understood an embodiment thereof will now be described by way of example and with reference to the accompanying drawings in which:

FIGS. 3a and 3b show respective plan and side views of the clamp end of the vibrational force sensor of FIG. 1, and FIGS. 4a and 4b show respective bottom plane and side views of a bolt according to the invention for clamping a vibrational force sensor.

DETAILED DESCRIPTION OF THE PREFERRED EMBODIMENT

Figure 1:
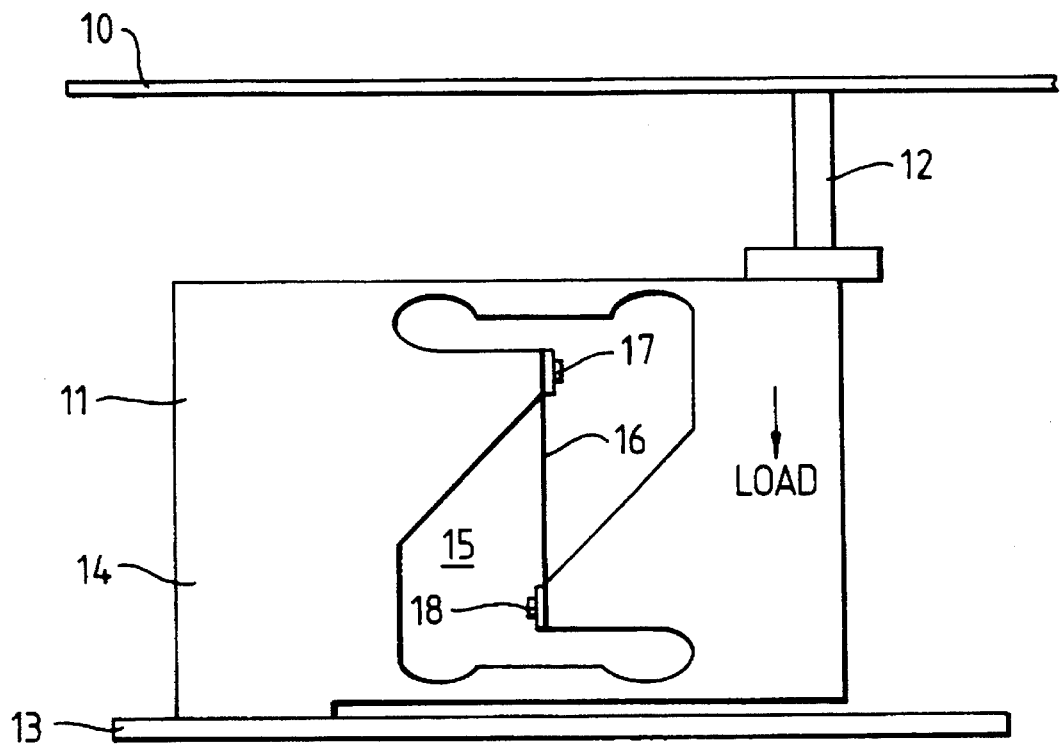
FIG. 1 is a diagrammatic side view of a weighing system incorporating a vibrational force sensor according to the prior art.

Referring now to FIG. 1 of the accompanying drawings this shows what is known as a Roberval mechanism. A weighing pan 10 is supported above a load cell 11 by a pan support 12. The cell 11 is made from a suitable metal and essentially comprises a hinged parallelogram. Thus the cell 11 is mounted on a base plate 13 at one side only, the mounting being indicated at 14.

As can be seen the bulk of cell 11 projects cantilever fashion over the base plate 13. The pan support 12 is mounted on the side of the cell remote from mounting 14. The central area of the cell 11 is cut away to leave a space 15 which in this embodiment resembles a crude representation of the letter Z. A two beam sensor 16 is mounted in this space by respective top and bottom sensor fixings 17 and 18 and is held under tension even when the cell is unladen. When a load is placed on the weigh pan 10 the cell 11 flexes in response to the added weight and changes the tension in the force sensor. In operation of the weighing system the sensor 16 is driven into flexural vibrations and these are detected. The frequency of the vibrations varies with the applied load so that a measurement of the load can be derived from the detected frequency.

Figure 2:
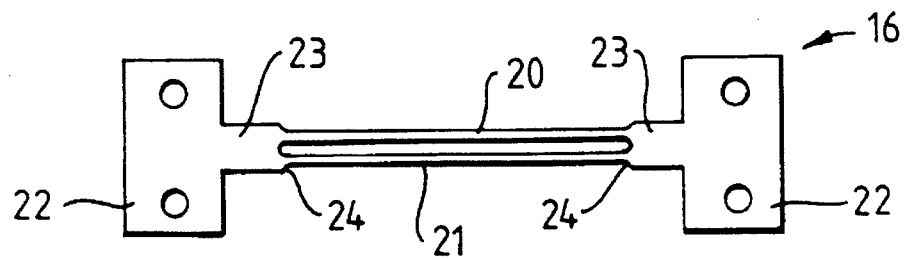
FIG. 2 is a plan view of the vibrational force sensor of FIG. 1, 1

Referring now to FIG. 2 of the drawings this shows a plan view of the sensor 16. The sensor is manufactured from metal or a metal alloy. It comprises two beams 20, 21 of equal width. The beams 20/21 are manufactured from a single piece of metal which has flanges 23 at each of its ends by means of which the sensor can be mounted in a load cell. As can be seen in FIG. 2 the two beams 20/21 extend from common beam mounting portions 22 having shoulders 24. The width of each shoulder 24 is approximately half of the space between the beams.

The clamping of vibrating beam force sensors has critical effect of their performance. An ideal clamp will only produce a force perpendicular to the surface to which clamping is required. Most clamps however produce forces parallel to the plane in which clamping is required. This is shown in FIGS. 3a, 3b where the vibrating beam force sensor 16 is shown clamped to part 4 of the loading frame of the cell 11 by a bolt 30 having a bolt head 31 and a washer 32. Ideally the clamping force will be provided solely by the tension induced in the bolt 30. However due to friction between the bolt 30, washer 32 and vibrating beam force sensor 16, the rotation of the bolt 30 cause a tightening torque 36 which in turn generates forces 37 and 38 in the vibrating beam force sensor 16. The magnitude of forces 37 and 38 is of an unpredictable amplitude. This effect products difference tension forces across the sensor. This reduces the Q factor of the sensor and encourages different modes of vibration to the ones being used in measurements. Both these effects are detrimental to the performance of the sensor.

Figure 4A:
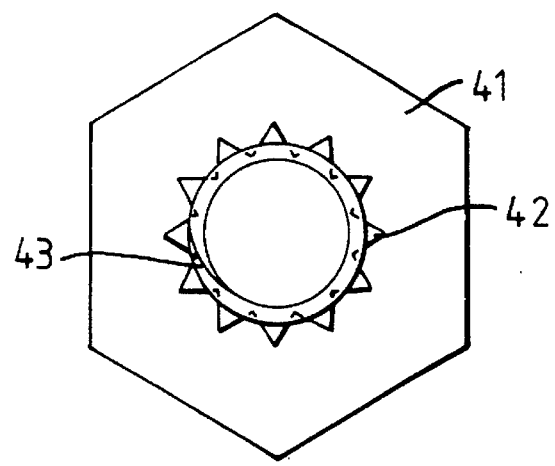
Figure 4B:
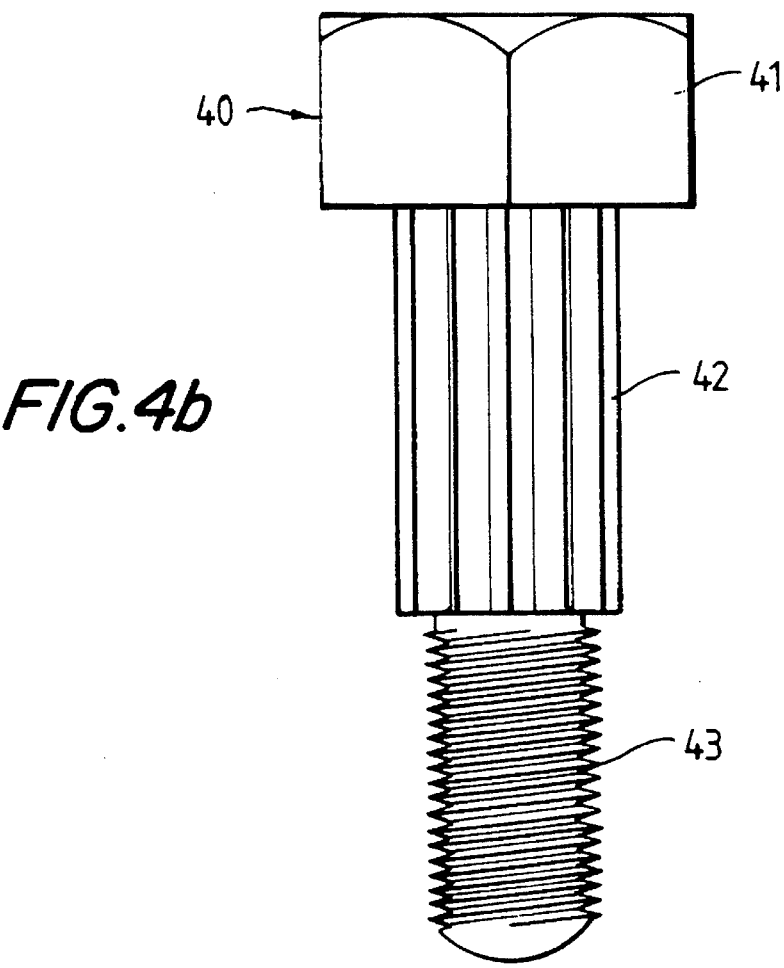

In order to remove these unpredictable forces the present invention proposes using a clamp bolt of the kind shown in FIGS. 4a, 4b. This bolt 40 consists of a head 41 under which the vibrating beam force sensor 16 is to be clamped. Under the head 41 is a section 42 formed into splines. The end of the bolt 40 has a threaded section 43. As can be seen this threaded section 43 has a smaller diameter than the splined section. In operation the vibrating beam force sensor is placed under the clamping head 41. The threaded section 43 of the bolt 40 is passed through a hole in the plate on which the sensor end is to be mounted, the hole having a diameter smaller than the outside diameter of the splined section. By means of a suitable nut the splined portion 42 of the bolt is drawn through the hole. The splines are of hardened steel or similar. Grooves are cut into the walls of the hole by the splines. These grooves prevent any rotation of the bolt and thus produce a pure clamp force perpendicular to the clamping face.

It will be appreciated that the important factor is that the portion between the bolt head and the threaded portion has at least one cross-sectional dimension greater than that of the threaded portion and of the hole through which the threaded portion passes.

The splined configuration shown is a particularly convenient and efficient one but is not the only one which can give effective results.

I claim:

1. A load cell for a weighing machine, comprising:
   a) a loading frame having a pair of support parts lying in a plane, said support parts having walls bounding respective mounting holes with respective predetermined cross-sectional mounting dimensions;
   b) a vibrating beam force sensor including opposite end regions having respective clearance holes; and
   c) means for clamping said opposite end regions of the sensor to the support parts with respective clamping forces directed solely in a generally perpendicular direction to said plane, including
      i) a pair of bolts having respective heads, respective threaded portions extending along respective axes, and respective intermediate portions located between the heads and the threaded portions, said intermediate portions having respective non-circular cross-sectional dimensions greater than said respective mounting dimensions of the mounting holes, and
      ii) a pair of nuts for respectively threadedly engaging the threaded portions and turnable about said respective axes the respectively moving the respective heads along said respective axes, and for respectively drawing the respective intermediate portions along said respective axes through the respective clearance and mounting holes to a clamped position in which the respective heads engage said opposite end regions of the sensor, and in which the respective intermediate portions solely engage the walls bounding the respective mounting holes with an interference fit, said opposite end regions of the sensor being engaged in the clamped position solely by said respective heads and said respective support parts.

2. The load cell as claimed in claim 1, wherein the intermediate portions have splines operative for cutting grooves in, as the splines are drawn through, the mounting holes.

3. The load cell as claimed in claim 2, wherein the splines are constituted of a hardened steel.

4. The load cell as claimed in claim 2, wherein the splines extend along, and are spaced around, the respective axes.

5. The load cell as claimed in claim 4, wherein each said mounting hole is circular, and wherein each said predetermined dimension is a diameter, and wherein each said non-circular dimension is measured between splines on opposite sides of the respective axes.

6. The load cell as claimed in claim 1, wherein each said head has a polygonal shape.

* * * * *